Oct. 13, 1925.
G. O. CROMWELL
1,557,142
ELECTRICALLY HEATED MELTING POT
Filed April 24, 1920      3 Sheets-Sheet 3
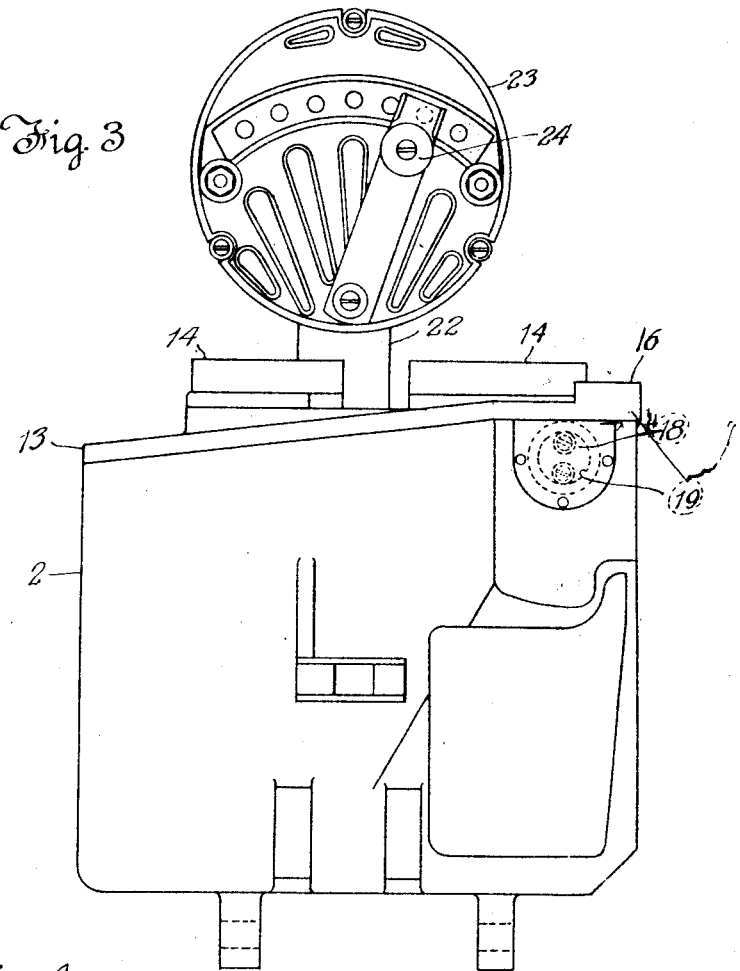
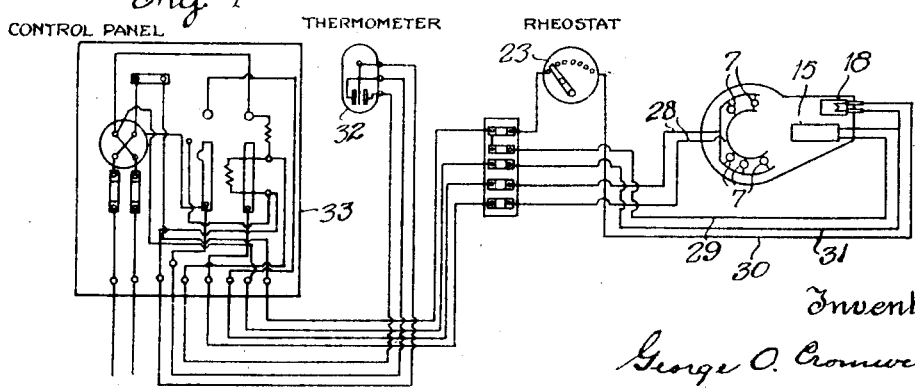

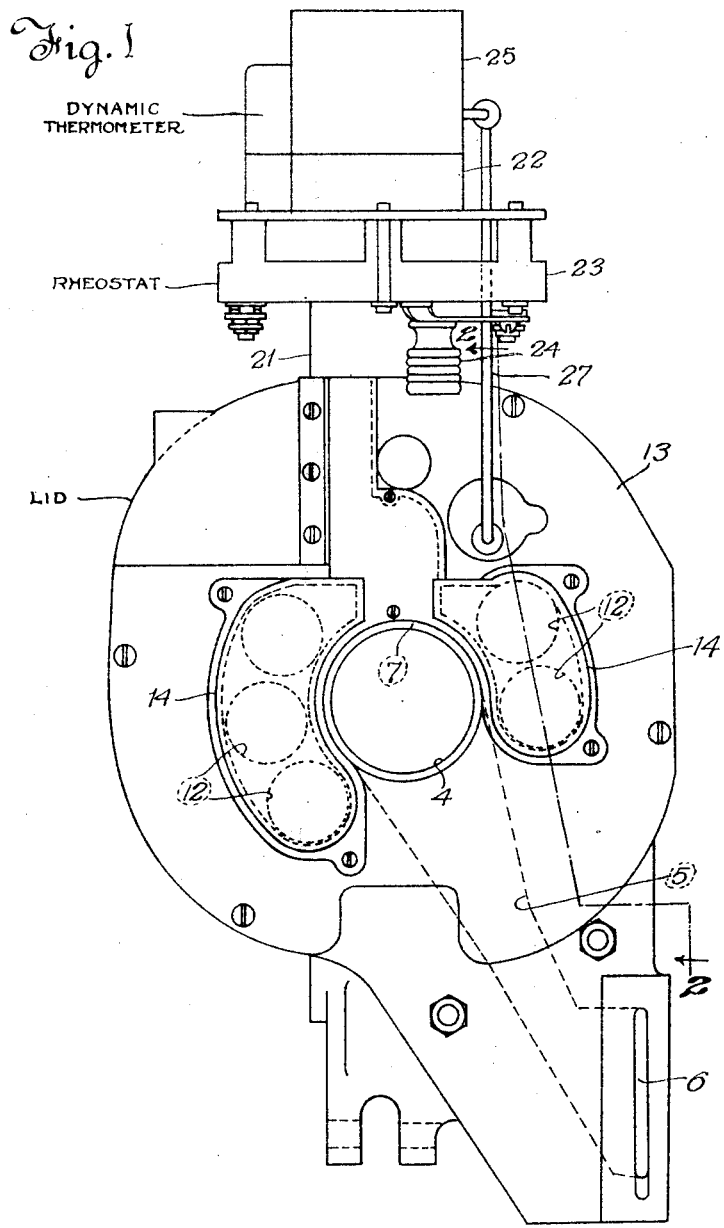

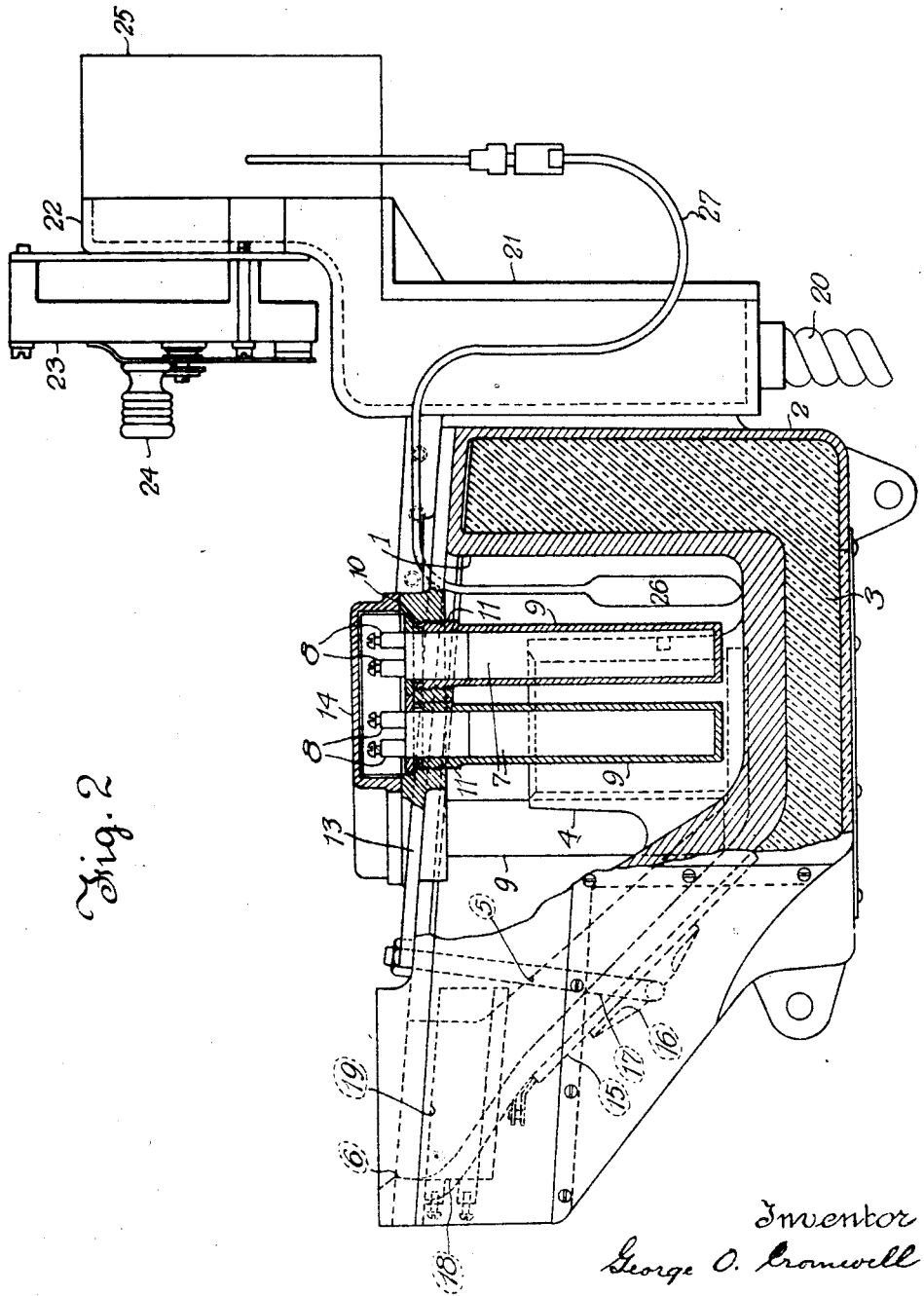

Patented Oct. 13, 1925.

1,557,142

UNITED STATES PATENT OFFICE.

GEORGE O. CROMWELL, OF CHICAGO, ILLINOIS, ASSIGNOR TO THE LUDLOW TYPOGRAPH COMPANY, OF CHICAGO, ILLINOIS, A CORPORATION OF ILLINOIS.

ELECTRICALLY-HEATED MELTING POT.

Application filed April 24, 1920. Serial No. 376,206.

*To all whom it may concern:*

Be it known that I, GEORGE O. CROMWELL, a citizen of the United States, and a resident of Chicago, county of Cook and State of Illinois, have invented a new and useful Improvement in Electrically-Heated Melting Pots, of which the following is a specification, the principle of the invention being herein explained, and the best mode in which I have contemplated applying that principle so as to distinguish it from other inventions.

The object of the present invention is to provide electrical heating means for metal melting pots such as are used, for example, in connection with typograph machines. The advantages of the use of electricity in place of the familiar gas burner in this connection are obvious, but on account of the fact that the pot requires to be movably mounted, and the further fact that the space available is rather cramped, some difficulty is encountered in properly arranging and disposing such electrical heating means. Furthermore, since it is desirable, in fact necessary, that the heating units be readily removable for the purpose of repair or replacement, irrespective of the condition of the metal in the pot, whether solid or molten, an added difficulty is presented. It is also desirable that the control of the current, and thus of the heating effect, be automatic as far as possible, and that, so far as manual control is involved, the means therefor be arranged for convenient operation.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Fig. 1 is a plan view of a metal melting pot of the character in question, showing my improved electrical heating means as applied thereto; Fig. 2 is partly a side elevation and partly a vertical section of the same, the plane of the section being indicated by the line 2—2, Fig. 1; Fig. 3 is a front elevation of such melting pot; and Fig. 4 is a diagrammatic view of the pot, heating elements, control panel, and wiring connections.

The general form and construction of the melting pot proper, to which I have shown my improved heating means as being applied in the aforesaid drawings, are similar to those of the pot shown and described in U. S. Letters Patent No. 1,124,293, to E. S. Carman, dated January 12, 1915, for improvements in casting mechanism for typographs. In other words, such pot comprises a chamber 1 adapted to contain the molten metal, such chamber being supported within and spaced from an outer casing 2 with a layer of heat insulating material 3 interposed. Chamber 1 is of general cylindrical form, and includes a sub-chamber or well 4 adapted to receive a piston or plunger (not shown), a spout 5 leading from said sub-chamber, through which spout the molten metal is forced through the mouth 6 when the plunger is depressed in actual operation of casting. Communication between chamber 1 and the sub-chamber 4 is furnished by a suitable aperture or apertures (not shown) in the wall of the latter, which apertures are closed as the plunger descends, as will be readily understood.

The electric heating means includes suitable heating resistance units, as will be presently described, that are disposed in the chamber 1, to initially melt the metal and maintain same in proper molten condition, as also other units disposed alongside the spout 5 and adjacent the mouth 6 to prevent cooling of the metal as it is discharged by action of the plunger operating in the sub-chamber 4. The heating resistance units 7 employed in the melting pot proper, i. e. in chamber 1, are of familiar construction such as are obtainable on the market in the form of elongated cylindrical members within which are embodied suitable resistance wires, so that when an electric heating current is passed therethrough, the member or unit rapidly becomes heated. Binding posts 8 at the upper ends of these units respectively provide means for attaching the necessary lead wires or conductors thereto. In order suitably to support these units in the metal in the pot, pockets or receptacles 9 are provided, consisting of cylindrical tubes closed at their lower but open at their upper ends, and provided adjacent such upper ends with a flange 10 and immediately below such flange with an externally threaded section 11, whereby such receptacles may be secured in correspondingly internally threaded openings 12 in the cover plate 13 of the pot. The length of the receptacles is such that when they are thus supported in chamber 1 of the pot, they clear the bottom of the latter by a substantial distance as shown in Fig. 2. It will further be noted that these receptacles are preferably located closely adjacent to the subchamber or plunger well 4, two receptacles lying on one side and three on the other of such well, as shown in Fig. 1. The interior openings in the receptacles 9 are of such dimensions that the units fit therein quite snugly, and yet are capable of being inserted or removed as occasion may demand. The upper ends of the receptacles, including the projecting binding posts 8, will ordinarily be contained within a suitable detachable enclosure 14, a separate such enclosure being provided for each of the two groups of receptacles.

For heating the throat or spout 5, a separate heating resistance unit 15 is provided, this being preferably in the form of a flat plate of general rectangular outline that is tightly clamped against the under surface of the spout by means of a retaining plate 16 which is held in place by a double-ended or U-shaped bolt 17 (see Fig. 2). To supplement the heating effect of said unit 15, I preferably employ another heating resistance unit 18 which is of cylindrical form similar to that of units 7 but smaller, this unit being snugly fitted in a cylindrical pocket 19 that is formed in the one wall of the spout alongside of and closely adjacent to the discharge nozzle or mouth 6.

The current for the various units just described is received through leads that are carried, by means of a suitable flexible conduit 20, to a terminal box 21 directly attached to the rear of the outer casing 2 of the pot. Extending upwardly from such box 21 is a bracket 22, to the front face of which is affixed a manually operable rheostat 23, the handle 24 of which will obviously be disposed within convenient reach of the operator. To the opposite face of said bracket 22 is affixed the operative element of a suitable dynamic type thermometer housed in a casing 25, the bulb 26 of such thermometer being connected with such operative element by a mercury tube 27.

The detailed wiring connections are shown in Fig. 4, from which it will be observed that the well heating units 7 are connected in parallel across leads 28, while the throat and mouth units 15 and 18 are supplied by separate leads 29 and 30, having a common return lead 31, the rheostat 23 being connected in said lead 30, so as to be adapted to regulate the heating effect at the mouth or discharge opening of the spout. The thermometer 32 is connected with a suitable automatic regulating device, which need not be described in detail, forming as it does no part of the present invention, such device being mounted on a panel 33 along with the usual switches and other control devices. The effect of the thermometer, of course, is to vary the flow of current to the well heating units 7, so as to maintain the body of metal within the pot at the proper temperature, and thus in desired molten condition. The throat-heating unit 15 is connected directly across the line in parallel with the mouth-heating unit 18, no control for said unit 15 being provided except the main switch. Said unit 18, on the contrary, is controlled by the rheostat 23 which is wired in series therewith.

The operation of my improved metal melting pot should be readily apparent from the foregoing description of the construction and mode of operation of its several component parts. By reason of the arrangement of the well heating units 7 it will be observed that any one of these can be readily removed by simply raising the corresponding cover 14, detaching the leads 28 from the appropriate binding posts, and leaving such unit out of its well or receptacle 9. All this can be accomplished without regard to the condition of the metal in the pot, whether solid or not. There is accordingly no possibility of the pot becoming frozen up, as may happen where heating units are directly immersed in the metal, should such heating units become inoperative for any cause. By having the terminal box directly attached to the pot so that all of the connections therefrom to the several heating units, as well as to the dynamic thermometer and rheostat may be encased without being anywhere exposed, danger of damage to these conductors, by spattering metal or otherwise, is practically eliminated. At the same time the pot with all of its heating appurtenances constitutes a self-contained unit which may be directly connected up with the panel-board, with a minimum of labor and by one having little or no skill in electrical construction.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a melting pot for typograph machines and the like, said pot having a main chamber, a sub-chamber, and a spout leading from such sub-chamber; of a cover for said pot having internally threaded openings; cylindrical tubes, closed at their lower ends, and each having a flange and an externally threaded section adjacent its upper end, whereby such tubes are secured in the openings in said cover so as to depend in the space between said sub-chamber and the outer wall of said main chamber; and corresponding electrical heating units removably held in said tubes.

2. The combination with a melting pot for typograph machines and the like, said pot having a main chamber, a sub-chamber, and a spout leading from such sub-chamber; of a cover for said pot having internally threaded openings; cylindrical tubes closed at their lower ends and each having a flange, and an externally threaded section adjacent its upper end, whereby such tubes are secured in the openings in said cover so as to depend in the space between said sub-chamber and the outer wall of said main chamber; corresponding electrical units removably held in said tubes, said units being inserted in said tubes from above and having binding posts projecting above said tubes; and a supplemental cover over such binding posts.

3. The combination with a melting pot for typograph machines and the like, said pot having a main chamber, and a sub-chamber, and spout leading from said sub-chamber; of a pocket mounted so as to extend into the body of metal in such main chamber; and an electrical heating unit removably held in said pocket, the inner end of the latter being closed; and a removable cover for the outer end of said pocket, whereby the contact of such metal with said unit is prevented.

4. The combination with a melting pot for typograph machines and the like, said pot having a main chamber, a sub-chamber and a spout leading from such sub-chamber; of a plurality of pockets mounted so as to extend into the body of metal in such main chamber; electrical heating units removably held in said pockets, the inner ends of the latter being closed; and a removable cover for the outer ends of said pockets, whereby the entrance or contact of such metal with said units is prevented.

Signed by me, this 19th day of April, 1920.

GEORGE O. CROMWELL.